US011218373B2

(12) United States Patent
Faber et al.

(10) Patent No.: US 11,218,373 B2
(45) Date of Patent: Jan. 4, 2022

(54) COMMUNICATION PARTICIPANT AND COMMUNICATION SYSTEM

(71) Applicant: Festo SE & Co. KG, Esslingen (DE)

(72) Inventors: Eduard Faber, Stuttgart (DE); Danny Schneider, Lichtenwald (DE); Christian Waldeck, Esslingen (DE); Carsten Clauss, Esslingen (DE); Thomas Lederer, Kernen (DE)

(73) Assignee: FESTO SE & CO. KG, Esslingen (DE)

( * ) Notice: Subject to any disclaimer, the term of this patent is extended or adjusted under 35 U.S.C. 154(b) by 303 days.

(21) Appl. No.: 16/166,918

(22) Filed: Oct. 22, 2018

(65) Prior Publication Data

US 2019/0123968 A1 Apr. 25, 2019

(30) Foreign Application Priority Data

Oct. 24, 2017 (DE) .......................... 102017219001.9

(51) Int. Cl.
*H04L 12/24* (2006.01)
*H04L 12/40* (2006.01)
*G05B 19/418* (2006.01)
*H04L 12/02* (2006.01)
*H04L 12/46* (2006.01)
*H04L 25/02* (2006.01)

(52) U.S. Cl.
CPC ............ *H04L 41/12* (2013.01); *G05B 19/418* (2013.01); *H04L 12/02* (2013.01); *H04L 12/40* (2013.01); *H04L 12/40032* (2013.01); *H04L 12/46* (2013.01); *H04L 25/0264* (2013.01)

(58) Field of Classification Search
None
See application file for complete search history.

(56) References Cited

U.S. PATENT DOCUMENTS

| 5,472,347 | A | 12/1995 | Nordenstrom et al. |
| 7,753,740 | B2* | 7/2010 | Carolis ............ H04L 12/40006 439/717 |
| 2005/0198339 | A1* | 9/2005 | Amrhein ............. G05B 19/042 709/230 |
| 2010/0008371 | A1* | 1/2010 | Brekke ............ H04L 12/40006 370/401 |
| 2010/0268850 | A1 | 10/2010 | Burton et al. |
| 2012/0041572 | A1* | 2/2012 | Halsall ............ H04L 12/40045 700/19 |
| 2015/0092355 | A1 | 4/2015 | Kretschmann et al. |
| 2017/0168472 | A1* | 6/2017 | Ando ................ G06F 9/44521 |
| 2017/0185556 | A1* | 6/2017 | Buttner ................. H04L 12/10 |

FOREIGN PATENT DOCUMENTS

EP 2642603 9/2013

\* cited by examiner

*Primary Examiner* — Anh Vu H Ly
(74) *Attorney, Agent, or Firm* — Hoffmann & Baron, LLP (57) ABSTRACT

A communication participant for an automation system, with a communication component that includes at least two identically formed communication interfaces, wherein each of the communication interfaces includes a receiving module for receiving incoming communication signals and a transmitting module for transmitting communication signals, wherein each of the at least two communication interfaces is designed for a communication with a directly adjacently arranged, plug-in connected communication participant and for a communication with a remotely arranged, cable-connected communication participant.

16 Claims, 3 Drawing Sheets

COMMUNICATION PARTICIPANT AND COMMUNICATION SYSTEM

BACKGROUND OF THE INVENTION

The invention relates to a communication participant for an automation system. In addition, the invention relates to a communication system.

An electrical bus communication system is known from EP 2 642 603 A1, which comprises a main communication module that is electrically connected via a direct plug-connection or via a cable connection to a plurality of modular I/O (input/output) units, which are at least partially arranged strung together, wherein each of the modular I/O units comprises an electronic circuit that allows an electrical communication with the main communication module, wherein the main communication module is designed to automatically address each modular I/O unit with a subnet address independently of its installation directly on the main communication module or remote from the main communication module, and wherein adjacently arranged I/O units are connected to one another by passive adapter plugs and I/O units arranged spaced apart from one another are connected to one another by cables via the interconnection of cable connection modules.

SUMMARY OF THE INVENTION

The object of the invention consists in providing a communication participant as well as a communication system, which ensure an improved transmission of communication signals with at the same time a simplified construction.

According to a first aspect of the invention this object is achieved for a communication participant of the type mentioned in the introduction comprising a communication component with at least two identically formed communication interfaces, wherein each of the communication interfaces comprises a receiving module for the reception of incoming communication signals and a transmitting module for the transmission of communication signals, wherein each of the at least two communication interfaces is designed for a communication with a directly adjacently arranged, plug-in connected communication participant and for a communication with a remotely arranged, cable-connected communication participant.

The communication participant that is used in particular in automation systems such as processing cells or assembly cells, is in particular a module from the group comprising input module, output module or input/output module. In a configuration of the communication participant as input module, this serves to collect and record signals of an external signal source, for example a sensor system, with which a measurement value necessary for the operation of the automation system can be recorded. In a configuration of the communication participant as output module, the communication participant can for example be used for the electrical control of an electric drive, in particular a motor or a magnetic switch or a magnetic drive. In practice such output modules are used in particular for the electrical control of electromechanical fluid valves, in particular pneumatic valves. In a configuration of the communication participant as input/output module, the communication participant can, as well as receiving and processing sensor signals, also transmit processed sensor signals or other control orders to suitable actuators.

In order to enable the desired influencing of a plurality of components within an automation system, the communication participant comprises two communication interfaces, each of which is designed for a bidirectional communication, i.e. a transmitting operation and also a receiving operation, with further communication participants. In this connection, it is envisaged that the at least two communication interfaces are identically designed, in particular have an identical technical structure, wherein each of the communication interfaces comprises a receiving module and a transmitting module. In this connection the receiving module serves to receive communication signals, which are transmitted by a further communication participant electrically connected to the respective communication interfaces. The transmitting module on the other hand serves for the transmission of communication signals to at least one other communication participant arranged adjacent to the communication participant. For this, it is envisaged that the transmitting module and the receiving module are designed so that they can communicate without any technical changes, in particular without altering their arrangement of electrical and/or electronic components, optionally with a directly adjacently arranged, plug-in connected communication participant or with a remotely arranged and cable-connected communication participant. Thus, the transmission module and the receiving module are in particular set up so as to analyse independently a communication connection with a communication participant and to take the necessary measures so that, depending on the type of communication connection present in each case (plug-in connected or cable-connected), advantageous adjustments can be made in each case for outgoing and incoming communication signals.

In the case of a communication with a plug-in connected communication participant, it is assumed that an electric line length between a first communication interface of a first communication participant and a second communication interface of a second communication participant is less than a few centimetres, in particular is in the range between 10 and 30 millimetres. In this connection it has to be assumed that in the case of a plug-in connection between two communication participants, the electric line length between the communication interfaces is simply determined by the physical extension of the two inter-engaging plug-in connectors.

On the other hand, it should be assumed that in the case of a remote arrangement of a second communication participant with respect to a first communication participant, an electric line length between the first communication interface and the second communication interface can be several centimetres and even up to several metres.

In the communication components envisaged for the communication participant, it is advantageous that in this way different electric line lengths can be operated from the communication interfaces, without the need for any technical changes to the communication interfaces. Accordingly, at least one further communication participant can be connected to the communication participants without the insertion of additional components, in which connection it is irrelevant whether the further communication participant is plug-in connected or cable-connected to the communication participant. Accordingly, a communication system constructed from such communication participants can include communication participants directly strung together (plug-in connected) and arranged with a high packing density, as well as communication participants or groups of communication participants arranged remotely and dispersed from one another (cable-connected), without the need for complicated and costly adaptation measures.

Advantageous developments of the invention are the subject matter of the sub-claims.

It is expedient if an electromechanical plug-in connector is associated with the communication interface, the connector being designed for a plug-in connection with a correspondingly designed plug-in connector of a communication participant that can be installed directly adjacent. Preferably, the electromechanical plug-in connector comprises a plurality of electric lines formed in particular at least over some regions as rigid contact pins or as elastic contact tongues, by means of which the supply voltages and communication signals can be transmitted from the communication interface and/or to the communication interface. For example, it is envisaged that the electromechanical plug-in connector is arranged laterally on a housing of the communication participant and comprises a plug-in projection and/or a socket recess, which is designed for the reception, in a socket recess and/or on a socket projection, of an adjacently arranged communication participant. In this connection the communication interface must be designed so as to adapt a transmission output for the transmission module and receiving properties for the receiving module to the short line length, in particular in order to avoid the transmission of signals with too high a signal level.

In addition or alternatively, it may be envisaged that an electromechanical plug-in connector is associated with the communication interface, the connector being designed for a plug-in connection to a connecting cable in order to allow a communication with a communication participant that can be installed remotely. In this case a communication is enabled starting from the communication interface via the plug-in connector and an in particular multicore-designed connecting cable connected electromechanically to the plug-in connector, as far as a plug-in connector of a communication participant that can be installed remotely. In this connection the connecting cable can have a cable length that is equal to or greater than a distance between communication participants. In this case the difficulty for the communication interface lies in overcoming a long communication route. The wired signal transmission between the communication interfaces is also complicated by the fact that, starting from the communication interface, first of all a plug-in connection with the connecting cable has to be created, which in turn is plugged into the plug-in connector of the communication interface of the remotely arranged communication participant on an opposite end region, so as to establish from there the communication with the associated communication interface.

Preferably, it is envisaged that the receiving module is equipped with a level detection module, which is designed to determine a signal level of an incoming communication signal and to output a level value, and is also equipped with an adjustment module associated with the receiving module, which is designed to adapt a reception sensitivity of the receiving module depending on the level value. As an example, it is envisaged that the level value detection module determines exclusively a level value for the incoming communication signal and transmits to the receiving module. In this case the receiving module is designed to compare the level value currently determined by the level detection module with a pre-determinable level range. Furthermore, the receiving module is arranged so as to raise the reception sensitivity of the receiving module if too low a level value was determined by the level detection module, or to reduce the reception sensitivity of the receiving module if too high a level value was determined by the level detection module.

In addition or alternatively, the level detection module or receiving module can be provided so as to transmit the determined level value in a communication signal to be transmitted to those communication participants from which the original communication signal was detected with the aid of the level detection module, in order in this way to adapt if necessary the signal level of the transmitting module of the communication interface of the other communication participant.

Purely by way of example, it may in addition or alternatively be envisaged that the level detection module and/or the receiving module can influence a communication signal to be transmitted from the communication interface in such a way that the information is output at an adjacently arranged communication interface, and that no communication signal was received within a pre-determinable time period, in order thereby to be able either to receive a test signal from the other communication interface or optionally to output an error notification, which is targeted at a communication disturbance with the adjacently arranged communication participant.

It is advantageous if the transmitting module includes an adjustment module for adjusting a signal level of a communication signal to be transmitted, which is adjusted depending on a level value of a level detection module and/or depending on a level value that is transmitted with the communication signal. The purpose of this adjustment module is to adapt a signal level of the transmitting module in a suitable manner to the communication circumstances between adjacently arranged communication interfaces. In this way, on the one hand a reliable and interference-free communication is ensured, and on the other hand the signal level of the communication signal to be transmitted does not cause undesired interference in the communication interface to be addressed, in particular does not lead to an undesirable overmodulation of the receiving module. In addition, with the smallest possible signal levels an interference emission due to the communication signal to be transmitted is kept as low as possible, which is particularly important when transmitting the communication signal via a cable connection, since this can possibly behave like a transmitting antenna. In this connection it may envisaged that the adjustment module determines the signal level of the communication signal to be transmitted with the aid of a communication signal received beforehand at the communication interface and transmitted by the communication interface now to be addressed, whereby a certain amount of information can be obtained regarding the quality of the communication connection between the two communication interfaces. In addition or alternatively, it may be envisaged that the adjustment module adjusts the signal level depending on a response from the communication interface to be addressed, wherein this response is transmitted via the communication signal in the form of a level value, although this procedure assumes of course a prior bidirectional communication between the two communication interfaces. In addition or alternatively, it may also be envisaged that the communication interface is equipped with an electronic circuit for determining a cable length, i.e. the length of an electric line path to the adjacently arranged communication interface, and the adjustment module adjusts the signal level for the transmitting module depending on the determined cable length. In this case it can additionally be envisaged to carry out a comparison between an expected signal level for the communication signal depending on the determined cable length, and an actually required signal level for the communication signal, and if necessary issue an error notification if a deviation occurs here that exceeds a pre-determinable threshold value. A deviation above the threshold value can for example be an indication of a defective plug-in connection for the cable or a damage to the cable or the use of an unsuitable cable.

In a further configuration of the invention it is envisaged that the communication component comprises a communication processor connected to the communication interfaces, which is designed to route communication signals, in particular unprocessed communication signals, between the at least two communication interfaces and also to determine control instructions from the communication signals that are directed in particular to the communication component. For example, the communication processor is provided for coordinating incoming and outgoing communication signals at the respective communication interfaces. In addition or alternatively, the communication processor can be used in order to relay at a first communication interface incoming communication signals in such a way to a second communication interface of the communication component that a pre-determinable time span elapses between the arrival of the communication signal at the first communication interface and the transmission of the communication signal by the second communication interface, so as to ensure for example that a pre-determinable system cycle is maintained. Particularly preferably it is envisaged that the communication processor does not undertake any processing of the communication signals that arrive at one of the communication interfaces and are to be retransmitted at the at least one other communication interface, in order thereby not to cause any undesired delay and/or falsification of the communication signals to be transmitted. In addition, the communication processor can be designed to examine incoming communication signals in order to see whether control instructions for the particular communication component and further components connected thereto are contained in the communication signals, and whether these control instructions have to be extracted from the communication signal.

It is advantageous if a computing unit is associated with the communication processor, which is designed to evaluate and process control instructions targeted at the communication component and to alter communication signals communication signals to be transmitted. Preferably it is envisaged that the computing unit is formed functionally separate from the communication processor, i.e. is for example associated as a discrete component with the communication processor, or with an implementation of the communication processor and the computing unit on a common integrated component, at least a further decoupling from the communication processor and computing unit is ensured. In this way an undesirable interaction between the processing procedures in the computing unit and the handing of communication signals in the communication processor should be avoided. Accordingly, the communication processor can be optimised for the relaying of communication signals and the extraction of control instructions, whereas the computing unit carries out the normally more complex processing of the control instructions and can be optimised for this purpose. In addition, the computing unit has the task of generating communication signals, which are then provided at the communication processor for the further relaying to at least one of the communication interfaces.

Preferably it is envisaged that the communication processor or the computing unit is connected to a connection module for outputting output signals and/or for receiving input signals. For example, the output signals and/or the input signals are digital signals. Such digital signals can for example be output by the connection module as output signals to a digital motor controller, or can be received as input signals by a digitally communicating sensor connected to the connection module.

In an advantageous development of the invention it is envisaged that the connection module comprises an analogue module, which comprises an analogue-digital convertor for the provision of analogue output signals depending on processed control instructions, and also comprises an associated analogue output for outputting the analogue signals and/or an analogue input for collecting analogue input signals and an associated analogue-digital convertor for the digitisation of the collected input signals. The object of the analogue module thus basically consists in the coupling the communication participant to components, which when controlled with an analogue output signal produce an actual physical effect, as is the case for example with actuators. In addition or alternatively, the analogue module can serve for the processing of input signals, which are provided for example by analogue sensors depending on actual physical effects. For example, it may be envisaged that a communication signal contains a control instruction targeted at the communication component, which is provided at one of the communication interfaces and is extracted from the communication signal by means of the communication processor. The control instruction is then converted in the computing unit into control signals, which are provided by the computing unit at the connection module, in particular at the analogue module, in order there to permit for example the release of a control current for an actuator connected to the connection module, in particular to the analogue module, of the communication participant, wherein the actuator may for example be a magnetic drive of a magnetic valve.

Alternatively, the control instruction is provided directly from the communication processor to the connection module, in particular to the analogue module, for which purpose a direct electrical connection (bypass line) may be provided between the communication processor and the connection module, in particular the analogue module.

In addition or alternatively, the analogue module is provided in order to scan one or more analogue inputs and detect and collect possibly occurring analogue input signals, in order to digitise these in a subsequent step using an analogue-digital convertor and optionally embed them in a communication signal, which is relayed via the communication processor and at least one of the communication interfaces to at least one other communication participant.

Preferably it is envisaged that the computing unit includes a computing interface, which is designed for a bidirectional digital data communication with an external computing unit, and that the computing unit is designed for outputting computed values and/or carrying out computing operations at the computing interface as well as for receiving computed results at the computing interface. Preferably it is envisaged that the computing unit is primarily arranged for processing simple control instructions, such as are required for example to control magnetic valves. More complex control instructions, such as for example the generation of control signals for complex drives such as brushless asynchronous machines, are outsourced by the computing unit of the communication component to an external computing unit, which however is provided only in the event that such complex computing operations actually also have to be carried out. The external computing unit can in particular be designed as a discrete integrated circuit and can be connected via the computing interface to the computing unit of the communication component. In this connection it may be envisaged that the computing unit of the communication component provides the computed values to be processed and/or the computing operations to be carried out at the computing interface and thus at the external computing unit, and furthermore picks up the computed results at the computing interface so as to be able to use these for the further internal processing.

Preferably, it is envisaged that the communication component comprises at least three identically designed communication interfaces and/or that the communication component is formed as an integrated circuit. When three identically designed communication interfaces are used, each of which is connected in a discrete manner to the communication processor, linear arrangements of communication participants can optionally be structured using two communication interfaces, or also tree-shaped arrangements of communication participants can be structured using all three communication interfaces, since the three communication interfaces allow a branching of an individual communication path into two communication paths. The configuration of the communication component as an integrated circuit, on which preferably in addition to the communication interfaces, the communication processor and the computing unit, also the analogue module together with the associated convertors is formed, allows a very direct and immediate signal processing to be carried out for communication signals as well as for signals of the analogue module, that is also at least almost free from time losses. Such a configuration of the communication component is important in particular for communication applications in which certain events have to be reliably transmitted within a predetermined time interval, in particular in a fixed time slot, and which are also termed real-time applications.

According to a second aspect the object of the invention is achieved for a communication system comprising multiple communication participants which are designed according to the invention, wherein at least two communication participants are arranged immediately adjacent to and plug-in connected to one another, and/or wherein at least two communication participants are arranged spaced from and cable-connected to one another. In this case the plug-in connected communication participants may possibly differ as regards their external shape from the cable-connected communication participants, since the electromechanical plug-in connectors may be otherwise shaped in order to allow either a direct juxtaposition of the communication participants or a spaced connection via cables. Preferably however it is envisaged that all communication participants are designed identically, irrespective of the intended communication connections. In a particularly advantageous embodiment it is envisaged that the electromechanical plug-in connectors, which allow the direct juxtaposition of neighbouring communication participants, can also be used as plug-in connectors for connecting cables, so that all communication participants have the same electromechanical configuration. In any case it is envisaged that the communication components in all communication participants are designed identically, so that the same hardware and the same software can be used for all communication participants, apart from possible electromechanical differences. This is important particularly for a possible security-related mode of operation of the communication system, since in this case simply a single hardware configuration as well as the related software has to be tested for compliance with the specifications of the respective type of security standard.

In one configuration of the communication system, it is envisaged that at least three communication participants are coupled to a connecting module, which is designed for a communication connection between a transmitting module of a first communication participant and a receiving module of a second communication participant, and also between a transmitting module of the second communication participant and a receiving module of a third communication participant, and between a transmitting module of the third communication participant and a receiving module of the first communication participant. The connecting module is preferably a purely passive component, which simply allows a pre-determinable wiring of the communication interfaces of the individual communication participants. In the case of a direct coupling of three communication participants it is envisaged that each of the communication participants is in each case in bidirectional communication with at least one communication participant connected thereto. If therefore a second communication participant is located between a first and a third communication participant, then a communication between the first and the third communication participant always takes place via the second (interconnected) communication participant. If on the other hand a connecting module is used to connect the three communication participants, then this connects the transmitting module of the first communication participant to the receiving module of the second communication participant and also between the transmitting module of the second communication participant to the receiving module of the third communication participant and the transmitting module of the third communication participant to the receiving module of the first communication participant. In the same way the connecting module can also be designed for a coupling of more than three communication participants.

In an advantageous development of the communication system, it is envisaged that at least one communication participant comprises at least three identically formed communication interfaces and that this communication participant is connected to three further communication participants, in order to form a communication branching. In this way it is possible to arrange a plurality of communication participants in a tree structure that comprises at least one branching, wherein it is preferably envisaged that all communication branches connected to the communication branching and consisting of one or more branches that are juxtaposed with or connected to one another by cables are in each case of equal status.

Preferably, it is envisaged that communication participants connected to the communication branching, which in each case are connected to an adjacently arranged communication participant and to at most two communication participants, form a physically linear and ring-shaped communication connection from the data technology aspect. If for example it is assumed from this that exactly one communication line is provided for a transmission of communication signals between two communication participants coupled to one another, then physically this forms a linear connection. Since furthermore it may be envisaged that a synchronous bidirectional communication between the two communication participants takes place on this one communication line, from the data technology aspect this is a closed-loop circuit.

In a further configuration of the communication system, it is envisaged that each of the communication interfaces of a communication participant is designed for an exclusive communication with a directly (plug-in or cable) connected communication interface of a further communication participant. This means that the communication system is not organised as a bus system, in which all information flows are administered by a single bus master and are transmitted via a continuous, uninterrupted bus line to the slave connected thereto. Rather, in the case of the communication system according to the invention a juxtaposition of point-to-point connections between adjacently arranged communication components is envisaged. This concept is also retained in a branching, since all communication signals that are incoming at the respective communication participant, which forms the communication branching, are always conducted via the communication processor and are relayed in a suitable manner from this to the connected communication interfaces.

Preferably, it is envisaged that at least one of the communication participants is connected via the communication interface to a bus node, which is designed for a bidirectional communication connection with a master bus system. For example, the bus node serves for a coupling of the communication system, which can also be termed the field level, to a master bus system, which can also be termed the command level. This bus system may for example be a field bus from the group Profibus, Profinet, Devicenet, Ethernet/IP, Interbus, EtherCAT, Modbus, Sercos or other field bus systems. In this way the communication system, which can be used for the local operation of a complex machine or equipment, can be brought into connection with a command level, which is used for example for the overall control of a factory.

DETAILED DESCRIPTION

A communication system 1, represented purely schematically in FIG. 1, comprises a plurality of differently formed communication participants, 2, 3, 4 and 5, which in a manner described in more detail hereinafter are electrically connected to in each case at least one further communication participant 2 to 5. The communication participants 2 to 5 are designed, purely by way of example, for controlling an actuator, in particular a valve 6 and/or for scanning a sensor 7. Thus, the communication system 1 together with the valves 6 mounted thereon and the sensors 7 forms an automation system with which, by incorporating further components not illustrated in more detail, such as for example rotary drives, linear drives, gripping means, etc., a complex machine, likewise not illustrated in more detail, in particular a processing machine or installation module, can be formed.

Purely by way of example, it is envisaged that the communication system 1 is connected via a bus coupler 8 to a bus line 9 of a bus system, not illustrated in more detail. In this connection it may be envisaged to issue control commands to the communication system 1 from a master control, not illustrated, for example a stored-program control (SPC), via the bus line 9, the commands being relayed within the communication system 1 to the communication participants 2 to 5 connected to the valve 6 or sensor 7 that is to be respectively addressed. For example, it is assumed that a bus protocol is transmitted according to one of the commercially available field bus systems via the bus line 9, and that a conversion of this bus protocol into communication signals for the communication system 1 takes place in the bus coupler 8.

Furthermore, it may be assumed by way of example that the bus participants connected to the bus line 9, not illustrated in more detail and provided for the control of the communication system 1, form a command level, whereas the communication system 1 together with the associated communication participants 2 to 5 and the valves 6 and also the sensors 7 together with possible further components, not illustrated, form a field level.

Figure 1:
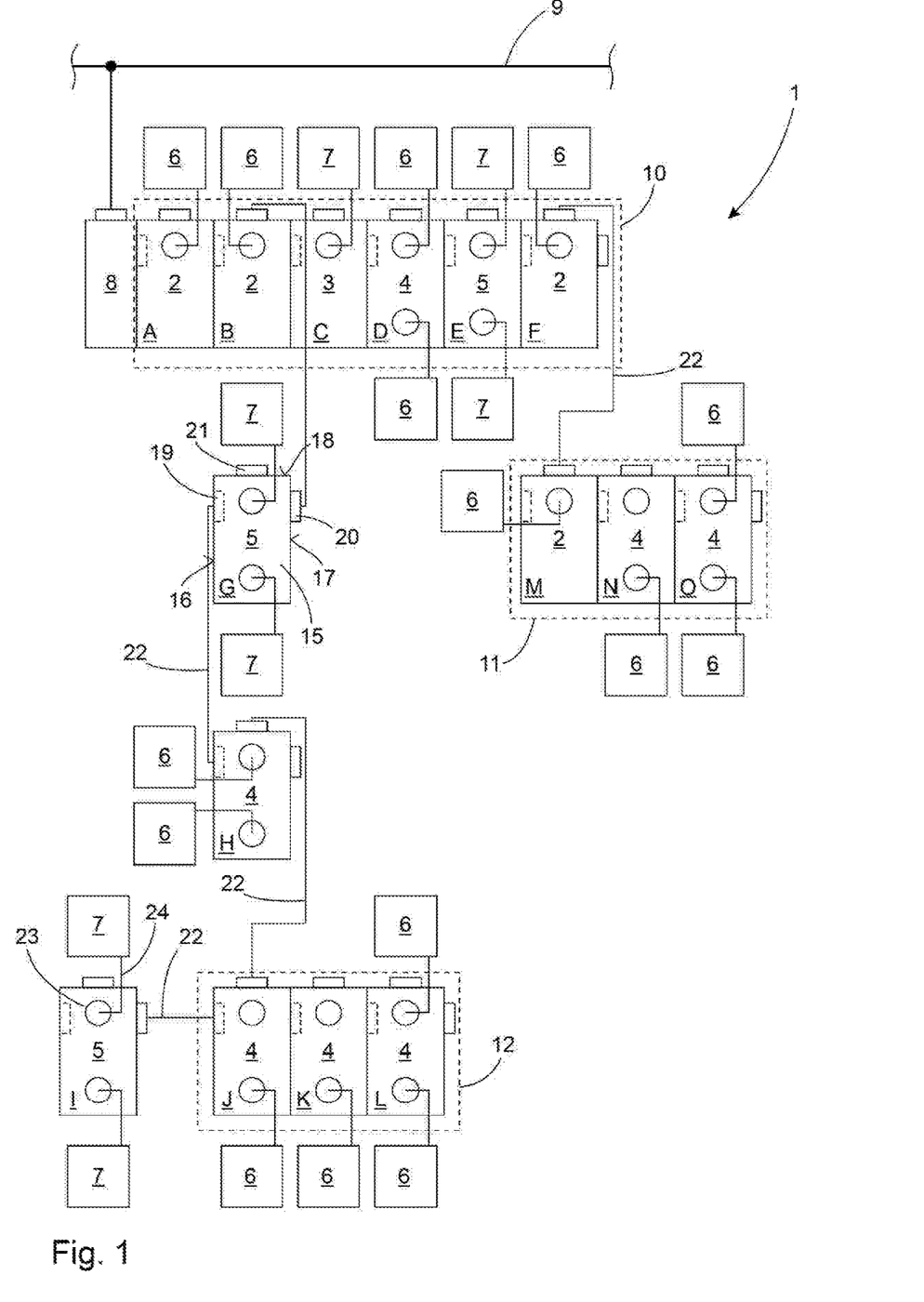
FIG. 1 shows a highly schematic representation of a communication system with directly adjacently arranged, plug-in connected communication participants and remotely arranged, cable-connected communication participants.

The arrangement of the communication participants 2 to 5 shown in FIG. 1 should be understood purely by way of example, and thus should simply be represented symbolically, that the communication participants 2 to 5 can optionally be strung together one after the other, in which the participant groups 10, 11 and 12 are formed by way of example according to FIG. 1. The arrangement of participant groups 10 to 12 is in this connection purely restricted to the electromechanical coupling of the respective communication participants 2 to 5, and accordingly no definitive statement is made concerning the communication connections for the communication participants 2 to 5 contained in each case in the participant groups 10 to 12, since at least individual communication participants 2 to 5 can also be connected by cable to remotely arranged communication participants 2 to 5.

It is envisaged purely by way of example that all of the communication participants 2 to 5 include in each case a rectangular shaped housing, wherein in each case a plug-in connector 19, 20 and 21 is provided on oppositely facing side surfaces 16, 17 of the housing 15 and also on a front surface 18 formed between the side surfaces 16 and 17. In this case it is envisaged for example that the plug-in connector 19, illustrated only by dotted lines, is formed as a recess socket in the housing 15, which is provided so as to receive the plug-in connector 20 designed as a plug protruding from the housing 15. The plug-in connector 21 is formed for example for the connection of a connecting cable 22 and can in particular be designed in the manner of the plug-in connector 19 or plug-in connector 20.

Furthermore, at least one module interface 23 is formed on the housing 15, to which can be connected, depending on the configuration of the respective communication participant 2 to 5, at least one valve 6 and/or at least one sensor 7 by means of a connecting cable 24. Depending on the configuration of the communication participant 2 to 5, an electrical or electronic circuit, not shown in more detail, can be arranged within the housing. This circuit can for example be designed as the final stage for controlling the valve 6 or an electric motor, not illustrated, or in the case of a configuration of the module interface 23 for connecting a sensor 7, can be designed for amplification of sensor signals of the sensor 7. In any case, each of the communication participants 2 to 5 comprises a communication component 25, illustrated in more detail in FIG. 3 and also described in more detail hereinafter, independently of whether or not the respective communication participant 2 to 5 includes one or more module interfaces 23 for the connection of valves 6 and/or sensors 7. The equipping of the communication participants 2 to 5 with the communication component 25 is also independent of whether or not the respective communication participant 2 to 5 is provided for the direct juxtaposition with an adjacent communication participant 2 to 5 in one of the participant groups 10 to 12, or for a cable-connected coupling to one or more communication participants 2 to 5 arranged remote from the participant groups 10 to 12.

Since in the communication system 1 according to FIG. 1 some of the communication participants 2 to 5 are arranged purely by way of example in the participant groups 10 to 12, while further communication participants 2 to 5 are arranged remote from the participant groups 10 to 12, a connection of the communication participants 2 to 5 of the participant groups 10 to 12 to the remotely arranged communication participants 2 to 5 via connecting cables 22 is envisaged. For example, if these connecting cables 22 on the communication participants 2 to 5 of the participant groups 10 to 12 are predominantly connected to the plug-in connectors 21, with a suitable design of the plugs of the connecting cable 22, not illustrated in more detail, they can also be connected to the plug-in connectors 19 or 20 of the respective communication participants 2 to 5. As is explained in more detail hereinafter in connection with FIG. 3, this does not play any role as regards the communication between the individual communication participants 2 to 5.

The arrangement of the bus coupler 8 on the communication participant 2 illustrated in FIG. 1 is also purely arbitrary, and the bus coupler 1 could also be coupled to any other arbitrary communication participant 2 to 5, either by plugging in directly or optionally with the interconnection of a suitable connecting cable. The object of the bus coupler 8 consists in the bidirectional data exchange between the communication system 1 and the field bus system, not illustrated in more detail, coupled via the bus line 9. For this purpose, the bus coupler 8 must normally be adapted individually to the requirements of the respective field bus system connected to the bus line 9, whereas the coupling to the communication system 1 is always identical and independent of the master field bus system.

Figures 2, 4:
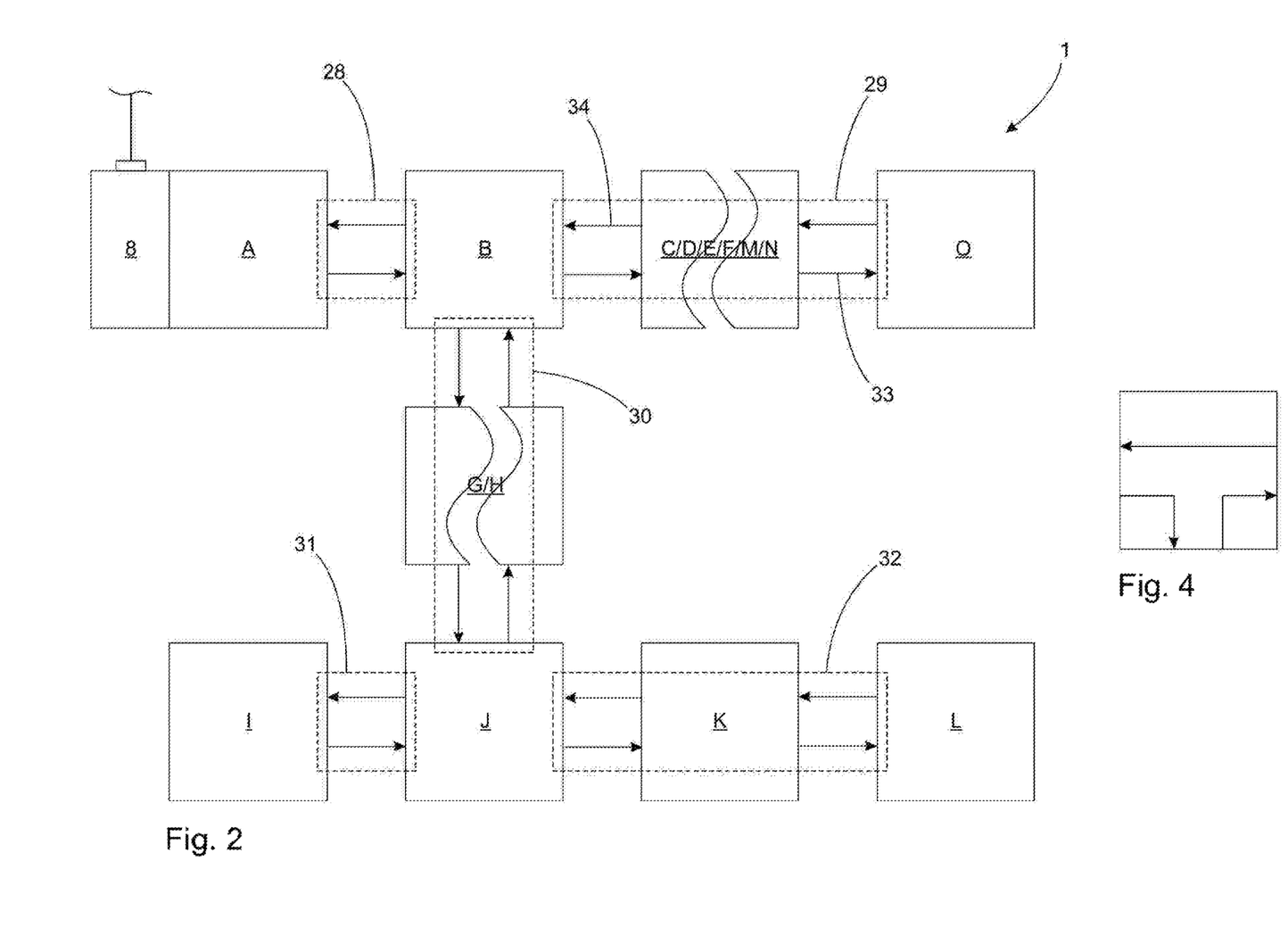
FIG. 2 shows a highly schematic representation of communication groups within the communication system according to FIG. 1.
FIG. 4 is a purely schematic representation of a connecting module.

As can be seen from FIG. 2, the communication system 1 illustrated in FIG. 1 is subdivided into multiple logic communication groups 28, 29, 30, 31 and 32, wherein here too the arrangement of the communication participants 2 to 5 in the respective communication groups 28 to 32 is given purely by way of example and can be adapted to the requirements of the respective automation system. In the representation shown in FIG. 2 the system boundary for the respective communication group 28 to 32 is in each case provided within a corresponding communication participant 2 to 5 if in total three further communication participants 2 to 5 are connected to the respective communication participant 2 to 5. For example, this is the case in the communication system 1 according to FIG. 1 for the communication participant 3 from the participant group 10 and for the communication participant 4 from the participant group 12, wherein this selection is purely arbitrary and would be possible in an identical manner for each of the other communication participants 2 to 5.

Within the respective communication group 28 to 32, a bidirectional communication is provided in each case between the respective communication participants 2 to 5. The communication participants 2 to 5 of all communication groups 28 to 32 form overall a closed-loop communication arrangement with regard to the relaying of the communication signals, as is described in more detail hereinafter in particular in connection with FIG. 3.

For example, a communication signal 33 leaving from a communication branching (communication participant 2 of the participant group 10 illustrated in FIG. 1 or "B" according to FIG. 2, and communication participant 4 of the participant group 12 illustrated in FIG. 1, or "J" according to FIG. 2) passes through all the communication participants 2 to 5 of the communication groups 28 to 32 connected in each case and is diverted at the in each case last communication participant 2 to 5 of the respective communication group 28 to 32, in order then to pass as an incoming communication signal 34 again through all communication participants 2 to 5 of the respective communication 28 to 32 up to the respective communication branching B, J.

Accordingly, the communication participants 2 to 5 form in purely physical terms a linear arrangement within the communication groups 28 to 32, since they are arranged either directly adjacently and plug-connected, or are arranged cable-connected remote from one another. With regard to the path of the communication signals 33, 34 within the respective communication groups 28 to 32, in each case a U-shaped communication path is formed through the respective communication group 28 to 32. This U-shaped communication path can alternatively be formed as an actual, electric conduction path, which in each case is formed over sections from the individual communication participants 2 to 5, or alternatively the communication path is simply a signal technical representation, which is transported on one or more communication lines, not illustrated in more detail, to the respective communication participants 2 to 5. The U-shaped communication paths of the individual communication groups 28 to 32 are assembled by the communication branching B, J to form a communication ring.

For example, an input signal 34 of the communication group 29 arriving at the communication branching B is relayed from the communication branching B to the communication group 30, in order to be relayed from there by the communication branching J first of all to the communication group 31 and then with the interconnection of the communication branching J, to the communication group 32. Then the signal 34 arriving from the communication group 32 is relayed from the communication branching J via the communication group 30 to the communication branching B, in order there to be transmitted to the communication group 28. The signal 34 arriving from the communication group 28 is then relayed by the communication branching B to the communication group 29, so that the communication ring is thereby closed.

Figure 3:
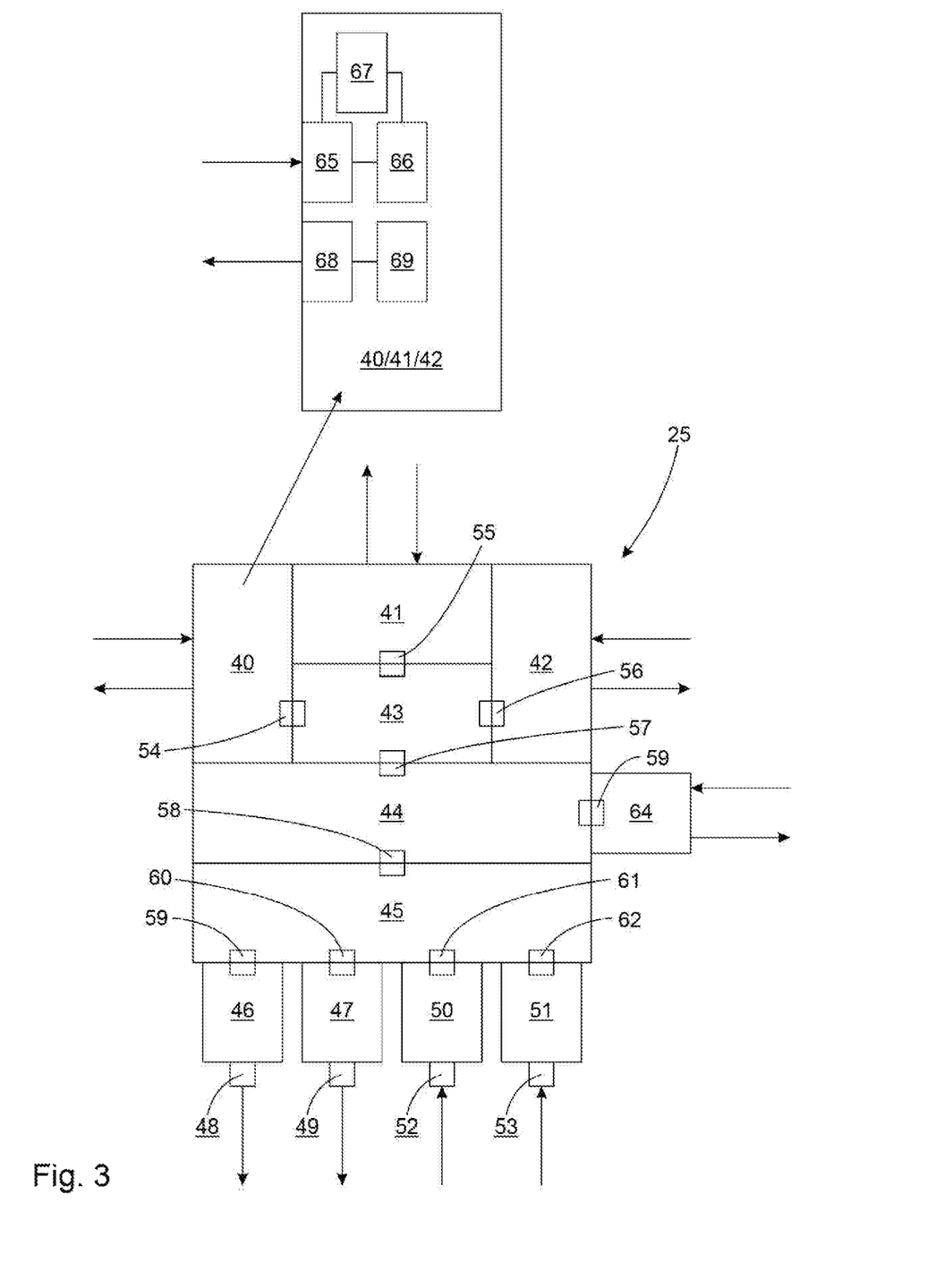
FIG. 3 shows a highly schematic representation of a communication component for use in one of the communication participants according to FIG. 1.

For the communication between the individual communication participants 2 to 5 the way in which the communication participants 2 to 5 are connected to one another (plug-in connection or cable connection) is not important, since always the same communication component 25 is responsible, which is not illustrated in more detail in FIG. 3. The communication component 25 can optionally be assembled, in a manner not described in more detail, as a communication circuit from discrete electrical and electronic components or preferably as an integrated circuit, and in particular can be designed as an application-specific adapted integrated circuit (ASIC). The communication component 25 comprises multiple function groups, which will be discussed in more detail hereinafter and which do not necessarily have to be represented as discrete components or regions in the electrical or electronic structure of the communication component 25.

For example, it is envisaged that the communication component 25 comprises three communication interfaces 40, 41, 42, which are in each case identically constructed, so that the following discussion of the communication interface

40 is also relevant for the further communication interfaces 41 and 42. Furthermore, the communication component 25 comprises a communication processor 43, which is designed for the relaying of communication signals that arrive at the respective communication interfaces 40 to 42, to in each case other communication interfaces 40 to 42. Furthermore, the communication processor 43 is designed for determining or extracting control instructions from the communication signals that arrive at the communication interfaces 40 to 42. In addition, the communication component 25 comprises a computing unit 44, which is designed to evaluate control instructions and to convert the control instructions into control signals, and also to generate communication signals, which are transmitted via at least one of the communication interfaces 40 to 42.

The control signals generated by the computing unit, which exist in digital form, are then converted in an analogue module 45 into analogue signals, so that these can be transmitted for example to a valve 6 or to another type of actuator. For this, the analogue module 45 comprises, purely by way of example, two digital-analogue convertors 46, 47, which for example include in each case an electrical final stage, not described in more detail, and are thereby able to provide an analogue signal level at an in each case associated analogue output 48, 49, with which a piezo valve or a magnetic valve or an electric motor for example can be operated.

Furthermore, the analogue module 45 contains purely by way of example two analogue-digital convertors 50, 51, which are respectively connected to analogue inputs 52, 53 and are designed for a digitisation of signals that are provided at the respective analogue inputs 52 and 53, in particular from sensors 7.

For example, it is envisaged that the three communication interfaces 40, 41 and 42 are connected in each case via identically formed internal interfaces 54, 55 and 56, and in particular exclusively, to the communication processor 43, so that at the respective communication interfaces 40 to 42 incoming communication signals are relayed, in particular in each case exclusively, to the communication processor 43. Preferably it is not envisaged to relay communication signals arriving at the communication interfaces 40 to 42 directly to other communication interfaces 40 to 42. The communication processor 43 is for its part equipped with a further internal interface 57, which is provided for a communication with the computing unit 44. The computing unit 44 comprises in addition to the internal interface 57 also an internal interface 58 for the communication with the analogue module 45, and also an internal interface 59 for the communication with a communication interface 64, which for its part is provided for a bidirectional data communication with an external computing unit, not illustrated, which if necessary can be arranged to support the computing unit 44 on the communication component 25. The analogue module 45 has in addition to the internal interface 57 also further internal interfaces 59, 60, 61 and 62, which are provided for an internal communication with the digital-analogue convertors 46 and 47 and the analogue-digital convertors 50, 51.

As can be seen from the sectional representation of the communication interface from FIG. 3, the communication interface 40 (conforming to the identically designed communication interfaces 41 and 42) comprises multiple function regions, which can be realised for example by means of electrical and electronic components, not illustrated in more detail. In order to process incoming communication signals the communication interface 40 comprises a receiving module 65, which performs a level adaptation, in particular an amplification, of the incoming communication signal and then relays the communication signal, in a manner not illustrated, to the communication processor 43.

For the level adaptation, a level detection module 66 and also an adjustment module 67 are associated with the receiving module 65. In this connection the level detection module 66 has the task of determining a signal level of an incoming communication signal and outputting a level value dependent on the latter. This level value can first be relayed to the adjustment module, so that this can carry out an adjustment of the reception sensitivity of the receiving module.

In addition or alternatively, the level value can be relayed, in a manner not illustrated in more detail, via the communication processor 43 to the computing unit 44, in order to generate there a communication signal, which includes the level value and which is conveyed to the communication participants 2 to 5 connected to the communication interface 40, in order optionally to be able to carry out there an adaptation of the communication signals to be transmitted.

For such an adaptation the communication interface 40 includes in addition to a transmitting module 68, which is designed to transmit communication signals, an adjustment module 69, which is provided in order to adjust a signal level of the communication signal transmitted by the transmitting module 68 depending on a variable specified value. This specified value can in particular be derived from a communication signal that has arrived at the receiving module 65 of the communication interface 40 and has been evaluated and processed by the computing unit 44. In addition or alternatively, an influencing of the specified value for the adjustment module 69 can also be undertaken by transmitting a test signal via the transmitting module 68 and evaluating a signal response to this test signal by means of the receiving module 65 and the associated level detection module 66.

In addition or alternatively, a determination of a length of a connecting cable 22 between adjacent communication participants 2 to 5 can also be carried out in a similar way. For this purpose, it may be envisaged that the transmitting module 68 transmits a defined test signal and determines a time within which the test signal is received again at the associated receiving module 65, in order to be able to determine therefrom the line length of the connecting cable 22.

It will be described hereinafter purely by way of example the way in which a relaying and optionally a processing of an incoming communication signal is carried out in a communication component 25. For this, only the functional connections in the communication component 25 will be referred to, while the concrete electrical and/or electronic relaying and processing of communication signals is not the subject matter of the following description.

First of all, an incoming communication signal 34 is received in the communication interface 40 by the receiving module 65 and is adapted as regards its signal level in such a way that it can be relayed with the lowest possible loss of power in the electrical sense and with the lowest possible loss in the data-technical sense to the communication processor 43. This is performed starting from the communication interface 40 via the internal interface 54.

The communication processor 43 is preferably designed in such a way that it relays the incoming communication signal 34 with as little delay as possible, in particular without any delay, to the further communication interfaces 41 and 42, where the communication signal can be relayed in each case as an outgoing communication signal to adjacently arranged but not illustrated communication participants 2 to 5. Furthermore, the communication processor 43 is designed so as to extract control instructions from the communication signal, which are intended for the respective communication component 25. This extraction of control instructions can be carried out for example with the aid of an address information within the communication signal, which agrees with an address of the communication component 25.

If such control instructions are not contained in the communication signal, the communication processor relays these control instructions via the internal interface 57 to the computing unit 44. The computing unit then has the task of generating from the control instructions suitable control signals for the actuators, for example the valves 6, electrically connected to the communication component 25 and/or of generating an enquiry signal for the sensors 7 connected to the communication component 25. For this, the computing unit 44 of an internal program, in particular of a software, is used, with the aid of which the control instructions can be converted into the control signals. The control signals determined by the computing unit 44 are relayed via the internal interface 58 to the analogue module 45 and are transmitted there in a suitable manner via the internal interfaces 59 and 60 to the digital-analogue convertors 46 and 47. There the conversion of the digital signals into analogue signals accordingly takes place, wherein depending on the connected actuator these analogue signals are output with a corresponding signal level, in particular a suitable current intensity for magnetic coils of valves 6.

If the communication participants 2 to 5 are electrically connected to one or more sensors 7, then a corresponding sensor signal is provided at least one of the analogue inputs 52, 53, which is converted by the analogue-digital convertor 50 or 51 into a digital signal and is provided by the analogue module 45 via the internal interface 58 to the computing unit 44. The computing unit 44 can, depending on the program that is operating, be provided for the direct relaying of the sensor signal to at least one of the communication interfaces 40 to 42. Alternatively, the computing unit 44 is designed for a processing of the sensor signal and the relaying of a processing result to at least one of the communication interfaces 40 to 42.

A processing of the sensor signal in the computing unit 44 can for example include a comparison of the signal level of the incoming sensor signal with a predetermined threshold value, wherein the computing unit 44 can for example transmit a corresponding signal to the communication interfaces 40 to 42 only if the threshold value is exceeded by the currently determined sensor signal. In this case it may in particular be envisaged that the computing unit 44 inputs a binary status signal into a data frame of the communication signal and then provides the communication signal via the communication processor 43 to the communication interfaces 40 to 42. There the communication signal forms an outgoing communication signal 33, which is provided for the relaying to at least one of the communication participants 2 to 5.

Since for each of the communication interfaces 40 to 42 a point-to-point communication with an adjacent communication interface 40 to 42 is always envisaged, the communication system 1 is not a conventional bus system, in which all the information from a bus master is communicated through a number of connected slaves. Rather, the communication system 1 is a tree structure provided with a plurality of communication branches, wherein the communication signals in the respective communication groups 28 to 32 in each case pass bidirectionally through the communication participants 2 to 5 of the corresponding communication group 28 to 32 and can be modified by each of the connected communication participants 2 to 5.

In this connection the communication protocol for the communication signals that is utilised by the communication participants 2 to 5 enables a general or an individual addressing, as desired, for contents of the communication signal. Thus, for example, it can be envisaged that one of the communication participants 2 to 5 feeds a generally valid item of information into the communication signal, which has to be observed by all the connected communication participants 2 to 5.

Alternatively it may also be envisaged that one of the communication participants 2 to 5 feeds an item of information specifically intended for another communication participant 2 to 5 within the communication system 1 to the communication signal, and carries out an appropriate addressing for this information, so that this information is processed exclusively by the addressed communication participants 2 to 5, whereas all other communication participants 2 to 5 simply relay the information contained in the communication signal.

The connection part 105 illustrated purely schematically in FIG. 4 can for example be used instead of the communication participant 2 according to FIG. 2 serving as communication branching B, and combines as passive component three communication participants 2 to 5 for example. In this case it is envisaged that the transmitting module 68 of the communication participant A is directly connected to the receiving module 65 of the communication participant G. Furthermore, it is envisaged that the transmitting module 68 of the communication participant G is directly connected to the receiving module 65 of the communication participant C. In addition, it is envisaged that the transmitting module 68 of the communication participant C is directly connected to the receiving module 65 of the communication participant A.

What is claimed is:

1. A communication participant for an automation system comprising a communication component that includes at least two identically formed communication interfaces, wherein each of the communication interfaces includes a receiving module for the reception of incoming communication signals and a transmitting module for the transmission of communication signals, wherein each of the at least two communication interfaces is designed for a communication with a directly adjacently arranged plug-in connected communication participant, and for a communication with a remotely arranged, cable-connected communication participant, and wherein the transmitting module of each of the communication interfaces includes an adaption module for adjusting a signal level of a communication signal to be transmitted, said signal level being adjusted with the adaption module depending on a signal level value transmitted with the communication signal, the communication interfaces being configured so as to adapt a transmission output for the transmitting modules to a short length of line to avoid transmission of signals greater than a prescribed signal level.

2. The communication participant according to claim 1, wherein each of the communication interfaces comprises an electromechanical plug-in connector, said connector being designed for a plug-in connection to a correspondingly designed plug-in connector of a communication participant that can be installed directly adjacent.

3. The communication participant according to claim 1, wherein each of the communication interfaces comprises an electromechanical plug-in connector, said connector being designed for a plug-connection to a connecting cable, in order to enable a communication with a communication participant that can be installed remotely.

4. The communication participant according to claim 1, wherein the receiving module is equipped with a level determination module, which is designed to determine a signal level of an incoming communication signal and to output a level value, and also with an adjustment module associated with the receiving module, which adjustment module is designed to adapt a reception sensitivity of the receiving module depending on the level value.

5. The communication participant according to claim 1, wherein the communication component includes a communication processor connected to the communication interfaces, the processor being designed to relay communication signals, in particular unprocessed communication signals, between the at least two communication interfaces and also to determine control instructions from the communications signals that are in particular targeted at the communication component.

6. The communication participant according to claim 5, wherein a computing unit is associated with the communication processor, which is designed to evaluate and process the control instructions targeted at the communication component and to alter communication signals to be transmitted.

7. The communication participant according to claim 6, wherein the communication processor or the computing unit is connected to a connection module for outputting output signals and/or for receiving input signals.

8. The communication participant according to claim 7, wherein the connection module includes an analogue module, which comprises a digital-analogue convertor for the provision of analogue output signals depending on processed control instructions and also comprises an associated analogue output for outputting the analogue signals and/or analogue input for determining analogue input signals, as well as an associated analogue-digital convertor for the digitization of the detected input signals.

9. The communication participant according to claim 6, wherein the computing unit includes a computing interface, which is designed for a bidirectional digital data communication with an external computing unit, and that the computing unit is designed for outputting computed values and/or computing operations at the computing interface, and also for receiving computed results at the computing interface.

10. The communication participant according to claim 1, wherein the communication component comprises at least three identically formed communication interfaces and/or that the communication component is formed as an integrated circuit.

11. A communication system comprising a plurality of communication participants, each of the communication participants having a communication component that includes at least two identically formed communication interfaces, wherein each of the communication interfaces includes a receiving module for the reception of incoming communication signals and a transmitting module for the transmission of communication signals, wherein a first transmitting module of a first communication participant of the plurality of communication participants includes an adaption module for adjusting a signal level of a communication signal to be transmitted, said signal level being adjusted with the adaption module depending on a level value of a level determination module of a second communication participant of the plurality of communication participants, the communication interfaces being configured so as to adapt a transmission output for the transmitting modules to a short length of line to avoid transmission of signals greater than a prescribed signal level, and
    wherein said second communication participant is arranged directly adjacent and is plug-in connected to the first communication participant, or is arranged spaced from the first communication participant and is connected by a cable with the first communication participant.

12. The communication system according to claim 11, wherein at least three communication participants are coupled to a connecting part, which is designed for a communication connection between a transmitting module of a first communication participant and a receiving module of a second communication participant, and also between a transmitting module of the second communication participant and a receiving module of a third communication participant, and between a transmitting module of the third communication participant and a receiving module of the first communication participant.

13. The communication system according to claim 11, wherein at least one communication participant comprises at least three identically formed communication interfaces, and that this communication participant is connected to three further communication participants, so as to form a communication branching.

14. The communication system according to claim 13, wherein communication participants connected to the communication branching, which are connected in each case to at least one adjacently arranged communication participant and at most two communication participants, form a physically linear and data-technical closed-loop communication connection.

15. The communication system according to claim 11, wherein each of the communication interfaces of a communication participant is designed for an exclusive communication with a directly connected communication interface of a further communication participant.

16. The communication system according to claim 11, wherein at least one of the plurality of communication participants is connected via one of its at least two communication interfaces to a bus coupler, which is designed for a bidirectional communication connection with a master bus system.

* * * * *